Dec. 6, 1938.  E. ROBERTS  2,139,464
METHOD OF GAUGING CENTRIFUGAL LININGS
Filed March 1, 1937
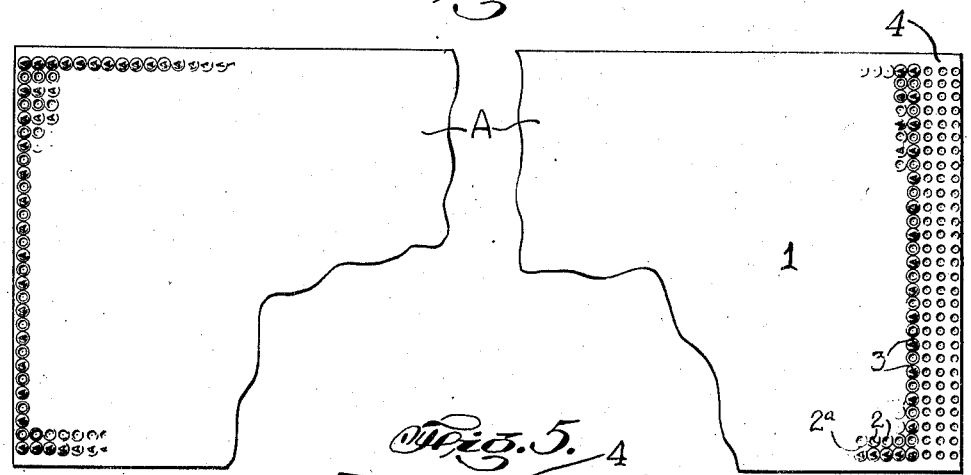
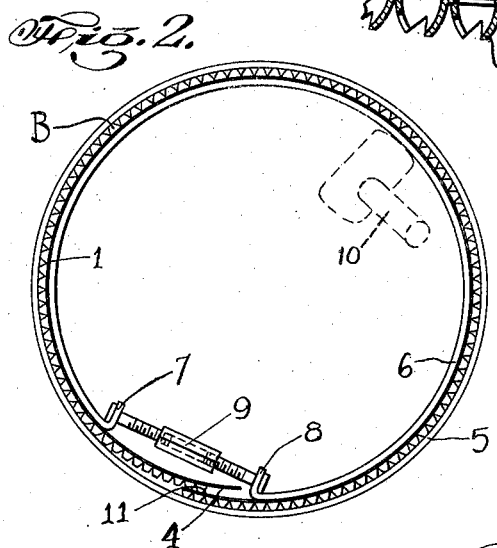
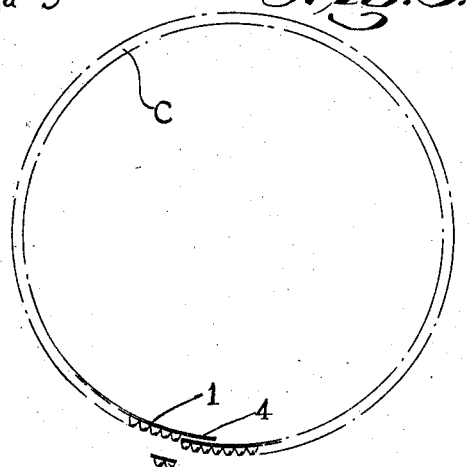
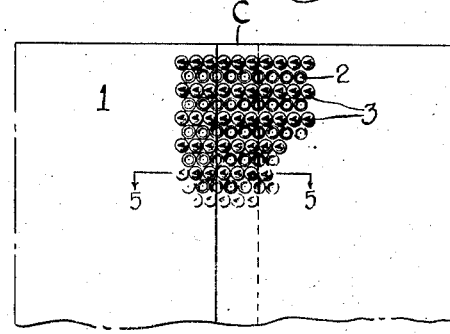
INVENTOR
EUGENE ROBERTS
BY
Hammond & Littell
ATTORNEYS Patented Dec. 6, 1938

2,139,464

UNITED STATES PATENT OFFICE 2,139,464

METHOD OF GAUGING CENTRIFUGAL LININGS

Eugene Roberts, Hastings, N. Y., assignor to The Western States Machine Company, New York, N. Y., a corporation of Utah Application March 1, 1937, Serial No. 128,397

5 Claims. (Cl. 29—148)

This invention relates to an improved method of gauging rigid or semi-rigid linings and backings of the type used as filtering and supporting elements in centrifugal machines. It is concerned principally with the fabrication of linings and backings for centrifugals used in the processing of sugar, starches and similar chemical substances, although it will be apparent as the description proceeds that the invention is not limited to the production of linings for any particular use.

Prior to my present invention centrifugal linings have been devised which consist of suitable perforated sheet material having protuberances for the purpose of supporting and spacing the lining away from the inner wall of a centrifugal basket. A lining or backing of this character is described in my United States Letters Patent No. 2,028,168, granted January 21, 1936. In the fabrication of these linings it is the usual practice to prepare a suitable strip of sheet material, generally sheet metal, by perforating the strip, stabbing out protuberances integral therewith and then cutting the strip to widths and lengths appropriate to the internal dimensions of the centrifugal baskets or other centrifugal supporting surfaces against which the individual linings or backings so produced are adapted to rest when in use. As a practical matter, stamping or stabbing procedure is employed in forming these perforations and protuberances since other procedures involve excessive operations and expense.

In the use of linings prepared as described above, or by any practicable inexpensive procedure, problems arise which have not been satisfactorily overcome prior to my present invention. The protuberances on the linings invariably are of irregular height and strength. When a strip of the lining material is cut to predetermined length and placed within a centrifugal basket for which it is intended the end edges of the strip may be in satisfactory registry, but after the lining has been subjected to the centrifugal forces and pressures encountered in use the higher and weaker protuberances are bent or turned in, and the location of the lining with respect to the basket wall is changed. Such change of location necessarily involves parting of the adjacent end edges of the lining with the results that deformation of the lining itself or of other fine filter linings positioned adjacent thereto takes place, filtration of the materials in the centrifugal is rendered nonuniform, and the basket tends to become unbalanced.

One of the requisites of a satisfactory lining is that it be substantially uniformly positioned with respect to the basket wall throughout its entire circumference. It is not practicable to estimate or calculate the extent of change which will take place in the position of the lining when subjected to the pressure encountered in use and then determine its final length in accordance with such an estimate, since this practice requires that the end margins of the lining be initially arranged in overlapping relation in the basket, and such overlapping prevents uniformity and result in deformation and other disadvantages. Moreover, no estimated or calculated length can be accurate because it is impossible to predict accurately the changes which will take place when the lining is subjected to high pressures and centrifugal forces.

It is therefore the purpose of my invention to provide an improved method of gauging centrifugal linings or backings which overcomes the aforementioned objectionable features of known methods and enables linings or backings to be fabricated to precise size at the place of manufacture and thereafter installed in baskets of standard size with assurance that no change in the relative location of the lining with respect to the basket will occur in actual use.

An important feature of the invention is that it permits a centrifugal lining or backing having protuberances extending from a face thereof to be gauged precisely so that it will fit into a basket in exactly the same manner as intended.

Another important feature is that the practice of the invention permits both the location of the lining with respect to the basket and the length of the lining to be fixed in exact accordance with requirements in use.

The accompanying drawing illustrates several stages in the application of the invention to the fabrication of an illustrative type of lining material and includes a diagrammatic illustration of apparatus which may be used in carrying out the improved method.

Figure 1 is a plan view, partly broken away, of a strip of lining material in condition to be gauged according to the invention.

Figure 2 shows diagrammatically suitable apparatus for use in gauging the lining, with the strip of lining material positioned therein.

Figure 3 indicates the condition of the lining after removal from the apparatus of Figure 2 and after severance of the excess length of the strip.

Figure 4 is a front elevation of the finished lining, showing in detail a suitable construction of perforations and protuberances adjacent meeting end edges of the lining.

Figure 5 is a cross sectional view of the lining material, taken along the line 5—5 of Figure 4.

The invention is illustrated as applied to the fabrication of a lining of the specific form illustrated in my Letters Patent above mentioned, although the improved method is applicable to any other form of centrifugal lining that is subject to the problems stated hereinabove.

In this illustrated form the lining material 1 consists of a sheet of substantially rigid metal having spaced rows of perforations 2 and intervening rows of depressed bosses 3, all of which are formed by suitable stabbing operations. The perforations 2 preferably are bounded by beaded edges 2a so as to increase the strength of the strip and prevent deformation under pressures encountered in the centrifugals. The depressed bosses 3 all extend from the same face of the sheet, and they are formed so as to provide a plurality of tongues 3a which serve to support and space the lining with respect to the inner wall of the centrifugal basket. In practice the tongues 3a are formed by the same operation which forms the bosses 3, and this operation also results in the formation of openings between the tongues which permit the flow of centrifugally extracted material through these openings as well as the perforations 2.

When the stamping or stabbing operations employed to form the tongues 3a are carried out carefully the tongues are all of substantially the same shape and dimensions, but even with the greatest care variations of a few thousandths of an inch occur. When a lining is prepared from such a sheet of material according to predetermined measurements it often occurs that the location of the lining with respect to the basket changes under conditions of use, and the disadvantages already mentioned are then encountered.

In the practice of my invention I prefer to form a sheet of the lining material 1, such as indicated at A in Figure 1, by cutting the sheet to the desired width, finishing it at one end portion and cutting the other end portion to a length slightly greater than the internal circumference of the centrifugal basket in which the finished lining is to be used. While the invention is in no way limited to such practice, I prefer to form the finished end of the strip with a marginal portion 4 which is provided throughout its area with perforations, such as those shown at 2, but left flat so that it will overlap an adjacent portion of the other end of the finished lining when properly positioned in the centrifugal basket. This overlapping relation is shown in Figure 5, and from this figure it will be understood that the effective edge of the finished end of the lining is the edge defined by the first vertical row of protuberances 3. Whether or not the strip embodies a substantially flat marginal extension such as that shown at 4, one of its end edges is preferably finished, and the other is extended beyond the approximate length necessary for the finished lining to fit properly within the basket.

The strip A, after being formed as just described, is placed within a strong cylindrical shell 5 (Figure 2), the radius of which is identical with the radius of the centrifugal basket in which the gauged lining is to be used. Thus if the lining is being prepared for use in the usual centrifugal basket having a diameter of 40", the shell 5 is one having a diameter of 40". The strip is placed within the shell 5 with its protuberances facing toward the shell and its end portions necessarily overlapped to a certain extent as indicated in Figure 2. The strip is then expanded outwardly against the shell 5 and pressed firmly thereagainst throughout the major portion of its area lying adjacent the shell. Since pressure very close to the overlapping end portions might result in deformation of the lining, I prefer to apply the pressure throughout the entire area of the lining, except those portions of the area near the overlapping ends.

A suitable manner of pressing the lining material against shell 5 involves the use of an expansile cylindrical, or substantially cylindrical, shell 6 arranged within the shell 5 and having a normal diameter slightly less than the diameter of shell 5. This inner shell 6 may comprise inwardly extending flanges 7 and 8 which are connected respectively to opposite ends of an expansile turn buckle 9. With the strip of lining material properly positioned between the two shells, the turn buckle 9 is operated to expand the inner shell and thereby to force the lining material firmly against the outer shell. In this manner I apply strong pressures to the lining material while it is still in an unfinished condition and I am thus able to bend or turn in the higher and weaker protuberances and to gauge the lining material exactly in accordance with the position it will assume when placed in use in a centrifugal basket of corresponding size.

By applying pressures to the lining of as high or higher order than the pressures encountered in actual use further variation in the location of the lining with respect to the centrifugal basket, due to further bending or turning in of protuberances during use, is completely avoided. Pressures of this order may be applied by the use of the expansile inner shell 6 alone. I prefer, however, after pressing the lining material firmly against the outer shell 5 by expanding the inner shell 6, to pound the lining against the outer shell with a hammer or other heavy instrument such as indicated at 10. Since in the preferred practice this pounding takes place while the material is pressed against the outer shell there is no deformation of the lining material, but any protuberances which are subject to bending under conditions of actual use will be bent during the pounding operation, and the lining material will assume a position with respect to the outer shell which is exactly the same as the position it will later assume during use inside a centrifugal basket.

The operations just described not only result in the gauging of the thickness of the lining but they also determine the length to which it must be cut for proper registry of its end edges when placed in use. The final position of the lining within the gauging apparatus is indicated in Figure 2. With the lining in this position, the point or line at which the excess length must be severed may be determined at a glance. For example, assuming the relation of the overlapping end portions, after pressing the strip against the outer shell, to be as indicated in Figure 2, the point 11 is determined as the point for severence of the excess material to produce a perfectly gauged lining. When this point has been determined the turn buckle 9 is operated to retract the inner shell 6, and the partially formed lining B is removed from the apparatus and the portion of the unfinished end extending beyond the point 11 is then severed in any suitable manner. Thus is obtained a finished lining such as shown at C in Figure 3 and a piece of scrap lining material, indicated at D in the same figure.

The finished lining C is perfectly gauged both as to length and height of the protuberances. When it is placed inside a centrifugal basket of the appropriate size its end edges are in perfect registry, and the marginal portion 4 of the one end properly overlies the adjacent end. Substantially the entire area of the finished lining lies snugly against the inner side of the basket, and the location of the lining with respect to the basket is in no way disturbed by pressures encountered in actual centrifuging operations. Thus I assure uniformity of spacing of the lining from the basket and uniform and perfect filtration throughout the entire area of the lining. Moreover there is no tendency for the lining to become bent or deformed during use.

The improved method herein described is useful for the fabrication of perfectly gauged linings from strips of varying length, whether or not an end edge of the strip is finished prior to the gauging operations. It is not restricted, however, to the gauging of both the height of the protuberances and the length of the lining in a single sequence of operations, since distinct advantages are obtained in the gauging of preformed strips already cut to length. Furthermore, the improved method is applicable to the gauging of any centrifugal lining whose dimensions are nonuniform, although it is particularly advantageous when applied in the fabrication of linings having regularly spaced protuberances, which may be tongues, lips, bosses, or the like, extending from one face thereof and adapted to support and space the lining with respect to a cylindrical supporting surface.

I desire that the invention be accorded a scope commensurate with the spirit of the specification and the terms of the appended claims.

I claim:

1. The method of gauging centrifugal linings having integral protuberances adapted to project between the lining and the inside wall of a centrifugal basket when placed in use, which comprises placing a strip of the lining material inside a cylindrical surface the radius of which is identical with the radius of the basket, with the protuberances extending toward the surface, pressing substantially the entire strip firmly and uniformly against the surface, pounding the strip while maintaining it pressed thereagainst to locate it with respect to the surface as it would be located with respect to the basket under the influence of the highest centrifugal force encountered in actual use, removing the strip from said surface, and finishing the strip for accurate registration of its marginal portions in accordance with their relative positions when located as aforesaid.

2. The method of gauging centrifugal linings having integral protuberances adapted to project between the lining and the inside wall of a centrifugal basket when placed in use, which comprises placing a strip of the lining material of a length greater than the length to which it is desired to be gauged, inside a cylindrical shell the radius of which is identical with the radius of the basket, with the protuberances extending toward the shell, pressing the strip firmly against the shell throughout the major portion of its area adjacent the shell, pounding the strip while maintaining it pressed against the shell to locate it with respect to the shell as it would be located with respect to the basket under the influence of the highest centrifugal force encountered in use, and thereafter severing the excess length of the strip as determined by the overlapping thereof while so located.

3. The method of gauging centrifugal linings having protuberances extending laterally from the plane of the lining which comprises cutting a strip of the lining material of a width adapted for the internal depth of a centrifugal basket in which it is to be used and of a length greater than the final circumference to which it is to be gauged, placing the strip inside a cylindrical surface the radius of which is identical with the radius of the surface upon which the finished lining will rest in use so that end portions of the strip overlap, pressing the strip firmly against said surface throughout the major portion of its area adjacent the surface, pounding the strip while so pressed against said surface, removing the strip from said surface, and thereafter severing the excess length of the strip in accordance with the overlapping of its end portions when it is pressed firmly against the surface as aforesaid.

4. The method of gauging centrifugal linings having integral protuberances adapted to project between the lining and the inside wall of a centrifugal basket when placed in use, which comprises forming a strip of the lining material of a length greater than the length to which it is desired to be gauged and with an end edge thereof in finished condition, placing the strip inside a cylindrical shell the radius of which is identical with the radius of the basket, with the protuberances extending toward the shell and with end portions of the strip in overlapping relation, expanding the strip outwardly and firmly pressing it against the shell throughout the major portion of its area adjacent the shell, pounding the strip while maintaining it pressed against the shell to locate it with respect to the shell as it would be located with respect to the basket under the influence of the highest centrifugal force encountered in use, and thereafter severing the portion of the strip which overlaps and extends beyond said finished end edge when the strip is so located.

5. The method of gauging centrifugal linings having integral protuberances adapted to project between the lining and the inside wall of a centrifugal basket when placed in use, which comprises forming a strip of the lining material of a length greater than the internal circumference of the basket and with an end edge thereof in finished condition, placing the strip between the inner surface of an outer cylindrical shell the radius of which is identical with the radius of the basket and the outer surface of an inner, expansile, substantially cylindrical shell, with the protuberances extending toward the outer shell and with end portions of the strip in overlapping relation, expanding the inner shell against the strip and thereby pressing the latter firmly against the outer shell throughout the major portion of its area, pounding the inner shell and thereby the strip toward the outer shell to locate the strip with respect to the outer shell as it would be located with respect to the basket under the influence of the highest centrifugal force encountered in use, and thereafter severing the portion of the strip which overlaps and extends beyond said finished edge when the strip is so located.

EUGENE ROBERTS.